Oct. 18, 1960 A. Z. ROBINSON, JR 2,957,137
POLARITY COINCIDENCE CORRELATOR
Filed June 24, 1957
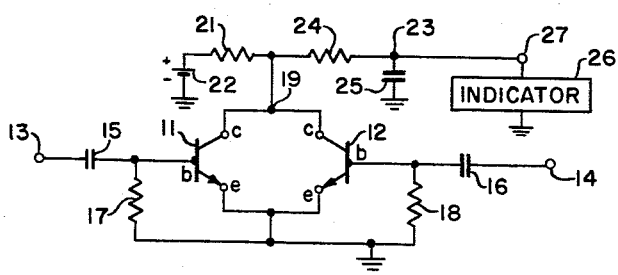
FIG.1.
FIG.3A.  FIG.3B.  FIG.3C.
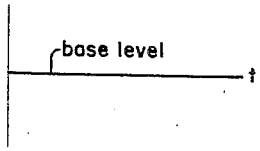
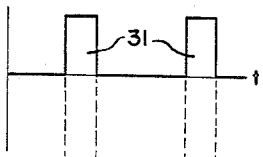
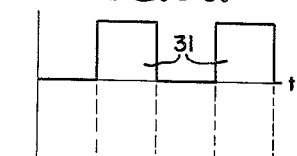
FIG.2A.  FIG.2B.  FIG.2C.
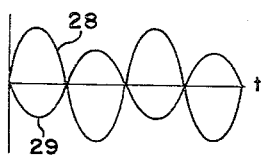
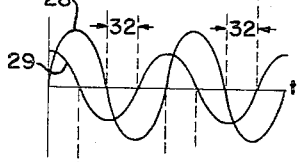
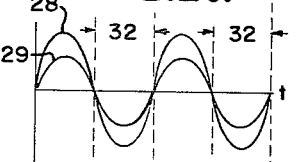
FIG.3D.  FIG.3E.  FIG.3F.
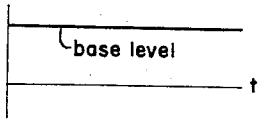
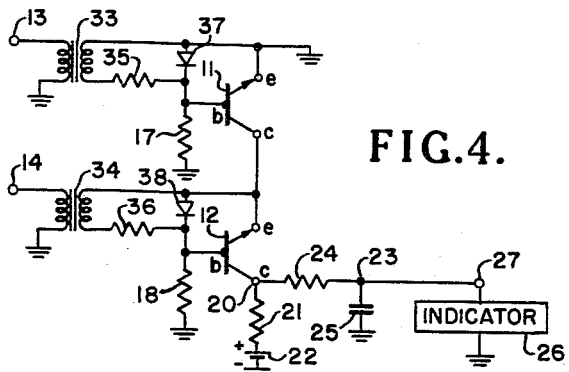
FIG.4.
INVENTOR.
A. Z. ROBINSON JR.
BY
ATTYS.

United States Patent Office

2,957,137
Patented Oct. 18, 1960

2,957,137

POLARITY COINCIDENCE CORRELATOR

Aaron Z. Robinson, Jr., Hyattsville, Md., assignor to the United States of America as represented by the Secretary of the Navy Filed June 24, 1957, Ser. No. 667,721

11 Claims. (Cl. 324—83)

(Granted under Title 35, U.S. Code (1952), sec. 266)

The invention described herein may be manufactured and used by or for the Government of the United States of America for governmental purposes without the payment of any royalties thereon or therefor.

This invention relates generally to coincidence circuitry and more particularly, to transistor circuitry for indicating the degree of polarity coincidence between a plurality of input signals.

Prior to this invention, circuits for the determination of the occurrence of coincidence between a plurality of input signals have been devised and utilized. The majority of these prior art circuits, however, have been designed around vacuum or gaseous electron discharge devices, such for example as the vacuum triode or the thyratron. By reason of the operating potential requirements of the tubes employed in these circuits, such as the filament and plate supplies, such circuits have of necessity been relatively complex and large in size and weight. In general, the prior art coincidence circuits embodying the transistor as the active element have been designed to merely produce an output signal in response to the simultaneous presence of two or more externally impressed signals and have not been designed to indicate the degree of coincidence correlation between the applied signals.

Accordingly, a principal object of the instant invention is to provide a new and improved coincidence indicating system.

Another object of the present invention is the provision of a novel transistor circuit selectively responsive to the polarity coincidence between a plurality of input signals.

A further object of this invention is to provide a novel signal coincidence circuit for indicating the degree of polarity correlation of the applied signals.

Still another object of the present invention is the provision of a novel signal coincidence responsive gating circuit.

Other objects and many of the attendant advantages of this invention will be readily appreciated as the same becomes better understood by reference to the following detailed description when considered in connection with the accompanying drawing wherein:

Fig. 1 is a schematic circuit diagram showing a preferred embodiment of a coincidence circuit in accordance with the present invention;

Figs. 2A through 2C are graphical illustrations of simultaneously applied input signals;

Figs. 3A through 3F are graphical illustrations of resultant output signals corresponding to the input signals of Figs. 2A–2C; and Fig. 4 is a schematic circuit diagram showing an alternative embodiment of a coincidence circuit in accordance with the present invention.

Referring now to the drawing wherein like reference characters indicate like or similar parts throughout the several views and more particularly to Fig. 1 in which a preferred embodiment of the novel coincidence circuit is shown as including a pair of parallel connected junction transistors 11 and 12 having input terminals 13 and 14, respectively. Transistors 11 and 12 are being operated in the conventional common emitter configuration wherein the signals impressed upon terminals 13 and 14 are applied through blocking capacitors 15 and 16 across resistors 17 and 18 to the base electrode $b$ of the respective transistors, and the output signal is taken from the junction point 19 of the commonly connected collector electrodes $c$. Resistors 17 and 18 also operate to establish the input signal level at which transistors 11 and 12 will be rendered transconductive and non-transconductive selectively. A load resistance 21 and a suitable operating energy source 22 are serially connected between the collector electrodes $c$ and emitter electrodes $e$ of the transistors, the source 22 being polarized to bias the collector electrodes in the reverse direction and the emitter electrodes in the forward direction. It will be understood by those skilled in the art that although the junction transistors 11 and 12 are shown as being of the N–P–N type, junction transistors of the P–N–P type may also be readily employed upon reversal of the polarity of energy source, or battery, 22. Connected to the junction point 19 is an output integrator circuit 23 consisting of resistor 24 and capacitor 25. A calibrated electroresponsive indicator, such for example as a voltmeter, oscilloscope, or graphic oscillograph, 26 is connected to an output terminal 27 across the capacitor 25.

The operation of the circuit of Fig. 1 may be described as follows: Assuming for illustrative purposes the application of two simultaneous signals, such for example as the sinusoidal waveform signals 28 and 29 illustrated in Figs. 2A through 2C, to the circuit input terminals 13 and 14, respectively. Under the influence of out of phase input signals as shown in Fig. 2A, each junction transistor will be alternately rendered transconductive and effectively operates as a closed switch, or gate, to ground whereupon the potential level of junction point 19 is reduced to ground level and no output impulse, as illustrated in Fig. 3A, is developed.

In response to input signals partially in phase, as shown in Fig. 2B, an output impulse 31, as shown in Fig. 3B, will be developed at junction point 19 over the time period 32 during which both transistors are in a non-transconducting state. In like manner, the application of input signals entirely in phase, as shown in Fig. 2C, will render both transistor switches 11 and 12 concurrently and sequentially transconductive and non-transconductive with a consequent output impulse 31 being developed at junction point 19 over the non-transconducting time interval 32, as shown in Fig. 3C. The developed output impulse signal 31 is fed to an integrator network 23 whereupon a resultant output signal corresponding to the average value of the developed impulses 31 is produced and impressed upon the electrical indicating means 26. The amount of integration effected by network 23 may be suitably adjusted to divers input signals; i.e. impulses, noise, etc., by variation of the time constant thereof. It will be apparent to one skilled in the art to which the present invention relates that by prior observation of the indicator 26 corresponding to applied signals having predetermined phase relationships, the indicator readings can be calibrated to accurately indicate the degree of polarity coincidence between applied input signals having unknown, or random, phase relationships.

Referring now to Fig. 4 of the drawing wherein an alternative arrangement of the polarity coincidence circuit according to the instant invention is shown, the junction transistors 11 and 12 are shown as being serially connected across resistor 21 and potential energy source, or cell, 22. The signals applied to input terminals 13 and 14 are coupled through isolation transformers 33 and 34, respectively, and loading resistors 35 and 36 respectively, to the base $b$ and emitter $e$ electrodes of the semiconductor switching elements 11 and 12, respectively. Semiconductive diode elements 37 and 38 are connected across the emitter $e$ and base $b$ electrodes of the respective transistors in order to maintain the loading across the transformers substantially constant during the "on" and "off" operating intervals of transistors 11 and 12, respectively. Resistors 17 and 18 serve to establish the desired operating levels of transistors 11 and 12, respectively.

The operation of the series coincidence circuit of Fig. 4 in response to the application of simultaneous input signals thereto is substantially identical to that of the parallel coincidence circuit of Fig. 1. For example, assume the application of the completely out of phase signals 28 and 29 of Fig. 2A to input terminals 13 and 14. Under the influence of these signals the serially connected transistors will be alternately rendered transconductive and non-transconductive, thereby maintaining the circuit path from potential energy source 22 to the load resistor 21 continuously interrupted. Under these conditions the potential level at circuit junction point 20 will be proportional to the potential of battery 22, which level may be considered as a base level, as shown in Fig. 3D. Upon the application of a pair of input signals partially and completely in phase, as illustrated in Figs. 2B and 2C, respectively, the serially connected semiconductor junction elements 11 and 12 will be rendered concurrently transconducting and non-transconducting. However, unlike the parallel coincidence circuit of Fig. 1, output impulses 31 will be developed at junction point 20 only during the concurrently transconducting interval 39 as shown in Figs. 3E and 3F of the drawing. As in the coincidence circuit of Fig. 1, the developed impulses 31 are integrated by integrator network 23 and the resultant signal transmitted to the calibrated polarity coincidence indicating means 26.

Whereas the polarity coincidence circuit of the instant invention has been described with particularity with reference to a pair of sinusoidal input signals of like frequency, it is not so limited and may be used with equivalent advantage for signals having random waveforms and frequencies, such for example as noise, or impulse signals. Furthermore, by the addition of parallel transistor stages to the circuit of Fig. 1 and series transistor stages to the circuit of Fig. 4, the degree of correlation between a multiplicity of input signals may be accurately determined.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A polarity coincidence circuit comprising a plurality of transistors each having emitter, collector, and base electrodes, said emitter and collector electrodes of said plurality of transistors being commonly connected, a plurality of bi-polarity signal sources each connected to one of said base electrodes for rendering the respective transistor transconductive in response to one signal polarity and non-transconductive in response to an opposite signal polarity, operating potential supplying means connected across said commonly connected emitter and collector electrodes, said means being adapted to produce an output signal only upon all of said transistors being concurrently rendered non-transconductive, and electrical means predeterminately responsive to said output signal for indicating the magnitude of polarity coincidence between the signals of said sources.

2. A polarity coincidence circuit according to claim 1 and further including an integrating network electrically interposed between said commonly connected electrodes and said electrical means.

3. A circuit as defined in claim 1 wherein said electrical means comprises a calibrated voltmeter.

4. A circuit as defined in claim 1 wherein said operating potential supplying means comprises a single unidirectional potential source.

5. A polarity coincidence circuit comprising a plurality of tandemly connected transistors each having emitter, collector, and base electrodes, a plurality of bi-polarity signal sources each connected to one of said base electrodes for rendering the respective transistor transconductive in response to one signal polarity and non-transconductive in response to an opposite signal polarity, circuit means for maintaining the load across said sources substantially constant during both the transconductance and non-transconductance operating stages of said transistors, operating potential supplying means connected across said tandemly connected transistors, said supplying means being adapted to produce an output signal only upon all of said transistors being concurrently rendered transconductive, and electrical means predeterminately responsive to said output signal for indicating the magnitude of polarity coincidence between the signals of said source.

6. A polarity coincidence circuit according to claim 5 and further including an integrating network electrically interposed between said tandemly connected transistors and said electrical means.

7. A circuit as defined in claim 5 wherein said circuit means includes a unidirectional conductive element connected across each of said emitter and base electrodes.

8. A circuit as defined in claim 7 wherein said unidirectional conductive element comprises a semiconductor diode.

9. A circuit as defined in claim 5 wherein said electrical means comprises a calibrated potential responsive device.

10. A circuit for indicating polarity coincidence between a pair of concurrent bi-polarity input signals comprising a pair of transistors each having emitter, collector, and base electrodes, the respective emitter and collector electrodes of one transistor being commonly connected to the respective emitter and collector electrodes of the other transistor, a resistance individually interconnecting the base and emitter electrodes of said transistors for normally maintaining the respective transistors non-transconductive, a capacitor individually connected to the base electrode of each of said transistors for applying one input signal to its respective transistor, an energizing circuit including a unidirectional electrical energy source coupled across said commonly connected emitter and collector electrodes for rendering each of said transistors individually transconductive in response to the application of an input signal of a preselected polarity and for developing an output pulse signal only during the period of concurrent non-transconductance of said transistors, means for developing an integrated signal in response to the developed output pulse signal, and means predeterminately responsive to the magnitude of said integrated signal for indicating the degree of polarity coincidence between the concurrent bi-polarity input signals.

11. A circuit for indicating polarity coincidence between a pair of concurrent bi-polarity input signals comprising a pair of transistors each having emitter, collector, and base electrodes, the collector electrode of one transistor being connected to the emitter electrode of the other transistor, a resistance individually interconnecting the base and emitter electrodes of said transistors for normally maintaining the respective transistor non-transconductive, a transformer individually connected between the base and emitter electrodes of each transistor for applying one input signal to its respective transistor, a unidirectionally conductive element individually connected between the base and emitter electrodes of each transistor, an energizing circuit including a unidirectional electrical energy source coupled across the emitter electrode of said one transistor and the collector electrode of said other transistor for rendering each of said transistors individually transconductive in response to the application of an input signal of a preselected polarity thereby to develop an output pulse signal only during the period of concurrent transconductance of said transistors, means for developing an integrated signal in response to the developed output pulse signal, and means predeterminately responsive to the magnitude of said integrated signal for indicating the degree of polarity coincidence between the concurrent bi-polarity input signals.

References Cited in the file of this patent

UNITED STATES PATENTS

| | | |
|---|---|---|
| 2,250,708 | Herz | July 29, 1941 |
| 2,287,174 | Hiesing | June 23, 1942 |
| 2,370,692 | Shepherd | Mar. 6, 1945 |
| 2,627,039 | Williams | Jan. 27, 1953 |
| 2,718,613 | Harris | Sept. 20, 1955 |
| 2,750,559 | Smith | June 12, 1956 |
| 2,757,286 | Wanlass | July 31, 1956 |
| 2,806,153 | Walker | Sept. 10, 1957 |
| 2,820,143 | D'Nelly | Jan. 14, 1958 |
| 2,859,347 | Dunham | Nov. 4, 1958 |

FOREIGN PATENTS

| | | |
|---|---|---|
| 1,010,178 | Germany | June 13, 1957 |

OTHER REFERENCES

"Measuring Phase Angles in Communication Circuits," article in Tele-Tech, December 1949, pp. 36-37.